(12) United States Patent
Zhdanova et al.

(10) Patent No.: US 12,647,189 B2
(45) Date of Patent: Jun. 2, 2026

(54) METHOD AND SYSTEM FOR AUTHENTICATING AN OPTICAL FIBER KEY

(71) Applicant: Terra Quantum AG, St. Gallen (CH)

(72) Inventors: Ekaterina Zhdanova, St. Gallen (CH); Mikhail Vyatkin, St. Gallen (CH); Mikhail Yarovikov, St. Gallen (CH); Alexander Smirnov, St. Gallen (CH); Alexander Gutor, St. Gallen (CH); Gordey Lesovik, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 156 days.

(21) Appl. No.: 18/187,838

(22) Filed: Mar. 22, 2023

(65) Prior Publication Data

US 2023/0308190 A1 Sep. 28, 2023

(30) Foreign Application Priority Data

Mar. 23, 2022 (EP) .................................... 22163917

(51) Int. Cl.
*H04B 10/85* (2013.01)
*H04B 10/25* (2013.01)
(52) U.S. Cl.
CPC ............. *H04B 10/85* (2013.01); *H04B 10/25* (2013.01)
(58) Field of Classification Search
CPC ................................ H04B 10/85; H04B 10/25
See application file for complete search history.

(56) References Cited

U.S. PATENT DOCUMENTS

| | | | |
|---|---|---|---|
| 10,860,746 B2 | 12/2020 | Foster et al. | |
| 11,212,120 B2 | 12/2021 | Davis et al. | |
| 2008/0237506 A1 | 10/2008 | Ophey et al. | |
| 2011/0211827 A1 | 9/2011 | Soto et al. | |
| 2015/0229482 A1* | 8/2015 | Pinkse .................. | H04L 9/0852 380/28 |

(Continued)

FOREIGN PATENT DOCUMENTS

| | | |
|---|---|---|
| CN | 105099545 A | 11/2015 |
| CN | 112152725 A | 12/2020 |

(Continued)

OTHER PUBLICATIONS

Hidemi Tsuchida, "Characterization of optical resonators with an incoherent light", Dec. 31, 2012, Optics Express (Year: 2012).*

(Continued)

*Primary Examiner* — Pranesh K Barua
(74) *Attorney, Agent, or Firm* — Fitch Even Tabin & Flannery LLP

(57) ABSTRACT

A system and method for authenticating an optical fiber key includes selecting a plurality of at least partially randomized challenge pulse parameters, generating a first optical challenge pulse based on the plurality of at least partially randomized challenge pulse parameters, determining an optical response signal based on a reflected signal of the first optical challenge pulse from the optical fiber key, applying a comparing algorithm the optical response signal and an expected response based on previously recorded optical response signals of the optical fiber key to a reference optical challenge pulse for determining a similarity metric, and authenticating the optical fiber key based on the similarity metric.

17 Claims, 7 Drawing Sheets

26   28   23

24

~ 1-10 nm

(56) References Cited

U.S. PATENT DOCUMENTS

| | | | |
|---|---|---|---|
| 2016/0218867 A1 | 7/2016 | Nordholt | |
| 2017/0164191 A1* | 6/2017 | Orcutt | H04B 10/70 |
| 2018/0259737 A1 | 9/2018 | Lee et al. | |
| 2019/0138753 A1 | 5/2019 | Wallrabenstein | |
| 2019/0156066 A1* | 5/2019 | Foster | G06F 21/72 |
| 2020/0408574 A1 | 12/2020 | Waagaard | |
| 2024/0039740 A1* | 2/2024 | Pinkse | G02B 6/3855 |

FOREIGN PATENT DOCUMENTS

| | | | |
|---|---|---|---|
| CN | 113422682 A | 9/2021 | |
| WO | WO 2019/021206 A2 | 1/2019 | |
| WO | WO 2021/148222 A1 | 7/2021 | |

OTHER PUBLICATIONS

Yao et al., "Breaking limitations of fiber identification in traditional OFDR systems via compensation of initial optical frequency instability," *Optics Letters* (2020).

Japanese Patent Application No. 2023-027937, Office Action (Jun. 11, 2024).

European Patent Office, Extended European Search Report in European patent application No. 22163917.2, 8 pp. (Aug. 23, 2022).

Brinkmeyer, "Analysis of the backscattering method for single-mode optical fibers," *J. Opt. Soc. Am.*, 70(8): 1010-1012 (Aug. 1980).

Office Action issued in corresponding Chinese Application No. 202310221530.8; dated Mar. 14, 2026; in Chinese with machine English translation (21 pages).

\* cited by examiner

~ 1-10 nm

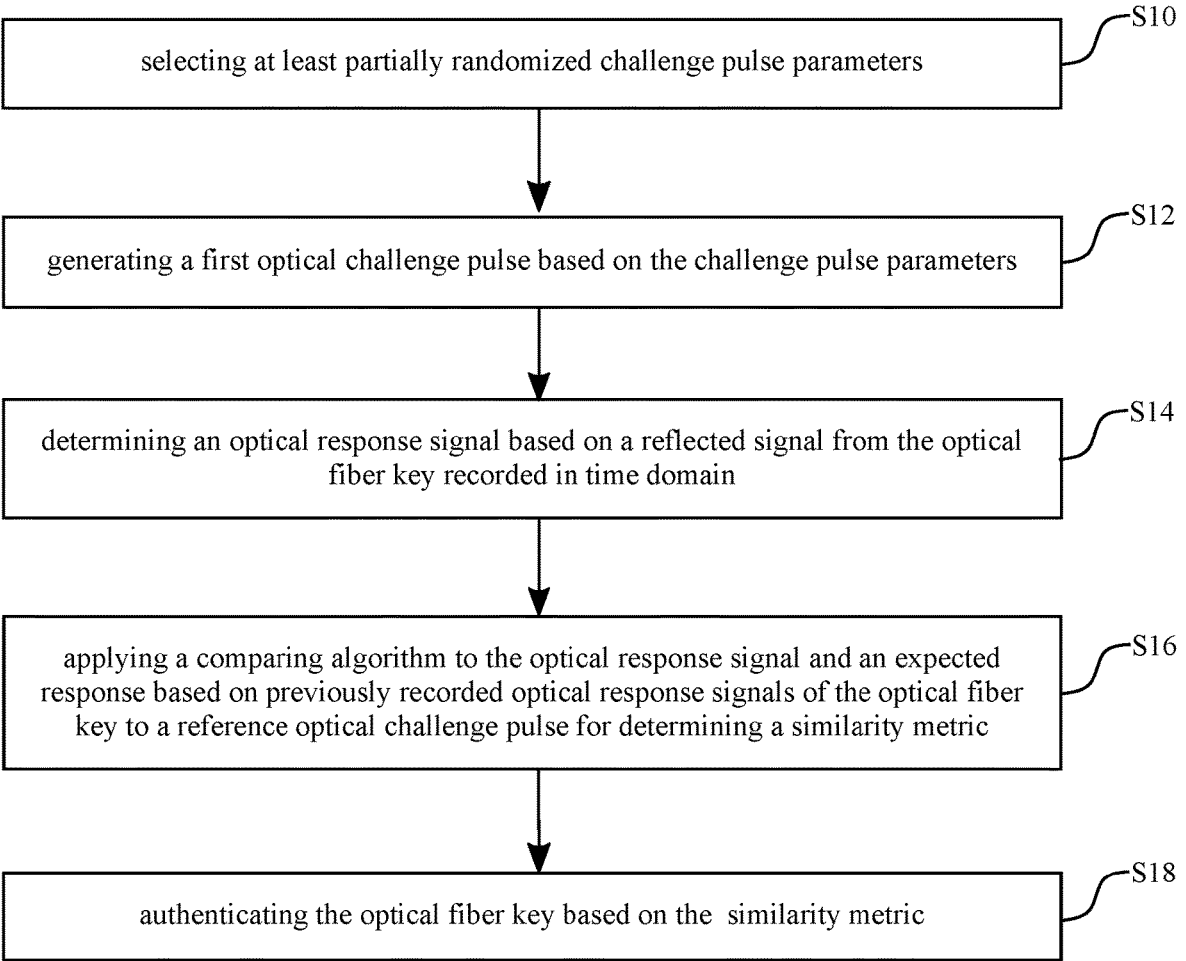

selecting at least partially randomized challenge pulse parameters ⌐S10 generating a first optical challenge pulse based on the challenge pulse parameters ⌐S12 determining an optical response signal based on a reflected signal from the optical fiber key recorded in time domain ⌐S14 applying a comparing algorithm to the optical response signal and an expected response based on previously recorded optical response signals of the optical fiber key to a reference optical challenge pulse for determining a similarity metric ⌐S16 authenticating the optical fiber key based on the  similarity metric ⌐S18

Fig. 2

| 1 | 0.99 | 0.98 | 0.97 | 0.97 | 0.96 | 0.95 | 0.95 | 0.94 | 0.93 | 0.9 |
|---|---|---|---|---|---|---|---|---|---|---|
| 0.99 | 1 | 0.99 | 0.99 | 0.99 | 0.97 | 0.97 | 0.97 | 0.96 | 0.95 | 0.93 |
| 0.98 | 0.99 | 1 | 0.99 | 0.99 | 0.98 | 0.98 | 0.98 | 0.97 | 0.96 | 0.93 |
| 0.97 | 0.99 | 0.99 | 1 | 0.99 | 0.99 | 0.98 | 0.98 | 0.97 | 0.96 | 0.93 |
| 0.97 | 0.99 | 0.99 | 0.99 | 1 | 0.99 | 0.98 | 0.98 | 0.97 | 0.96 | 0.93 |
| 0.96 | 0.97 | 0.98 | 0.99 | 0.99 | 1 | 0.98 | 0.99 | 0.98 | 0.96 | 0.94 |
| 0.95 | 0.97 | 0.98 | 0.98 | 0.98 | 0.98 | 1 | 0.99 | 0.98 | 0.97 | 0.95 |
| 0.95 | 0.97 | 0.98 | 0.98 | 0.98 | 0.99 | 0.99 | 1 | 0.99 | 0.98 | 0.96 |
| 0.94 | 0.96 | 0.97 | 0.97 | 0.97 | 0.98 | 0.98 | 0.99 | 1 | 0.99 | 0.98 |
| 0.93 | 0.95 | 0.96 | 0.96 | 0.96 | 0.96 | 0.97 | 0.98 | 0.99 | 1 | 0.99 |
| 0.9 | 0.93 | 0.93 | 0.93 | 0.93 | 0.94 | 0.95 | 0.96 | 0.98 | 0.99 | 1 |

Fig. 5

METHOD AND SYSTEM FOR AUTHENTICATING AN OPTICAL FIBER KEY

CROSS-REFERENCE TO RELATED APPLICATIONS

This patent application claims priority to European Patent Application No. 22163917.2, filed on Mar. 23, 2022, which is incorporated herein in its entirety by reference.

FIELD OF THE INVENTION

The present disclosure relates to authentication via physically unclonable keys and, more particularly, to authentication of a physically unclonable key which is optically investigated for authentication purposes.

BACKGROUND

For many applications it has become important to authenticate a user or a device, e.g., to enable access to digitized information, share cryptographic keys, mediate payments or even granting access to physical objects, such as vehicles or houses. The authentication builds upon an existing data channel for exchanging information and usually includes a "challenge" to provide a proof of identity and a "response" based on which the user or device can be authenticated, e.g., granted or denied access.

Cryptography and user authentication generally rely on one-way functions, which are functions, which are easy to compute, but difficult to invert. This addresses the general need that it should be easy for a legitimate user to authenticate himself, but practically unfeasible for an adversary to mimic as the legitimate user.

One class of such one-way functions are physical one-way functions, wherein a physical object, a so-called "key", is probed with a stimulus (challenge) to generate a response, which should be characteristic for the physical key. Generally, the principle that the physical object is physically unclonable, e.g., down to a microscopic or atomic structure of the object, is relied upon to probe the object in a way that the unclonable properties result in a characteristic response, which should be different for different challenges. These responses should also be unique, reproducible and identifiable, such that different physical objects can be reliably distinguished. In addition, a focus in the art lies on unpredictable responses that are mathematically unclonable and where tampering is evident.

For example, US 2008/00 237 506 A1 discloses an optical chip in which light is scattered in a light scattering element, which contains randomly distributed light scattering particles, which scatter incident light such that a random speckle pattern is created and spread over the light detecting elements to define a response. The challenge can be modified by picture elements in the device.

WO 2021/148222 proposes to use the complex transmission in an optical medium, such as a coiled-up section of a large-core fiber, for cryptographic key distribution. A challenge is sent as an ultrashort pulse having a shaped wavefront. The pulse is separated into different channels by the optical medium based on the internal microscopic scattering structure depending on the wavefront. The resulting signal in one of the channels can then be sent to the issuer of the challenge to authenticate the user. By reducing the amplitude of the pulse, only someone having the optical medium can practically discriminate between different challenge pulses.

US 2018/0259737 A1 teaches monitoring an optical fiber connection using Optical Time Domain Reflectometry (OTDR). The reflectogram of a target fiber connection is repeatedly recorded in order to identify whether an eavesdropper connects to the fiber. Based on changes in the reflectogram, a signal loss at an additional coupler along the connection may be observed and identified with the presence of an eavesdropper.

SUMMARY OF THE INVENTION

The known methods for authentication usually rely on the fabrication of complex devices or rely on accurate challenge control and response analysis. In particular, the reliance on interference, e.g., as part of speckle patterns, generally reduces the application scope to local authentication applications, e.g., due to physical limitations of common optical links and of light coherence.

In view of this state-of-the-art, the embodiments in accordance with the present disclosure provide a simplified and robust method for authentication of devices or users via a physically unclonable key.

According to a first aspect, the present disclosure relates to a computer-implemented method for authenticating an optical fiber key. The method comprises selecting at least partially randomized challenge pulse parameters, and generating a first optical challenge pulse based on the challenge pulse parameters. The method further comprises determining an optical response signal based on a reflected signal of the first optical challenge pulse from the optical fiber key and applying a comparing algorithm to the optical response signal and an expected response based on previously recorded optical response signals of the optical fiber key to a reference optical challenge pulse for determining a similarity metric. The method then comprises authenticating the optical fiber key based on the similarity metric.

The optical fiber key will generally comprise an optical fiber, which can transmit an optical signal over a distance of at least 100 m, and typically several kilometers. In some examples, the length of the optical fiber key may reach tens or hundreds of kilometers. The optical fiber key may be defined as a section of an optical fiber, such as a section of an optical fiber connection close to a receiver's end of a communication channel. In some examples, the whole optical connection may be considered as a set of optical fiber keys. Optical fibers generally comprise a silica core surrounded by a cladding, the core having a higher refractive index than the cladding to guide light along its length. To achieve this, the core of the optical fiber is usually doped with atoms such as Al, P, N, Ge, but the doping also enhances scattering at internal structure inhomogeneities (e.g., density fluctuations).

The internal chemical structure of the optical fiber, e.g., formed of an amorphous silica structure, can be considered unique and unclonable. At today's level of technology, it is practically impossible to make an exact copy of an elongated fiber piece. Additionally, the positions of doping atoms inside the core are random.

The invention proposes to use the back-scattering pattern of light at local fluctuations of the refractive index, which can arise from the unique internal structure of the optical fiber key, by recording the time varying reflected signal to a challenge pulse. The reflected signal depends on the refractive index variations along the optical fiber's length, e.g., due to Rayleigh backscattering effects, and may therefore be used to authenticate an optical fiber key based on reference data.

In preferred embodiments, the optical response signal is based on averaged variations of a backscattered light signal due to fiber core refractive index fluctuations of the optical fiber key.

The optical response signal should be sensitive to fluctuations of the fiber core refractive index originating from internal structure (e.g., mesoscopic, nanostructure, doping, and/or crystal/covalent-bonding structure) variations along the fiber core in order to make the method reliant on practically unclonable properties of the optical fiber. Preferably, the optical fiber key induced fluctuations in the optical response signal depend on fabrication-induced random structural variations of the internal structure of the optical fiber core, e.g., including the distribution of dopant atoms along the core of the fiber or amorphous silica structure. The variations of the backscattered light signal can be measured in the reflected signal, e.g., as variations of a detected backscattered light intensity.

The reflected signal will generally depend on the challenge pulse shape, and will generally be recorded as a reflected pulse arising from back-scattering along the optical fiber. The reflected signal can be recorded in time domain, e.g., using a photodiode, to record the back-scattered power profile originating from the first challenge pulse in the optical fiber key. The reflected signal may be processed to obtain an optical response signal, which can be independent of other portions of an optical fiber connection, such as a back-scattered power profile for the optical fiber key as a function of spatial position.

The resulting trace obtained by processing the reflected signal may be similar to a measurement of an optical time-domain reflectometry (OTDR) type measurement of the fiber section. Accordingly, an expected response may be based on previously recorded optical response signals of the optical fiber key to reference optical challenge pulses as part of an OTDR measurement of the optical fiber key.

However, a time-trace of the reflected signal obtained in a conventional OTDR measurement is in principle a deterministic result, which could be practically forged by modulating a signal according to a mathematical model of the optical fiber key, such as an average backscattered power distribution. Hence, corresponding schemes with physical optical fiber keys have not been considered previously as a basis for authentication, as the OTDR type response signal to a fixed stimulus may, in principle, not be mathematically unclonable.

To make the method tamper resistant for practical purposes, the inventors propose to at least pseudo-randomly modulate the properties of the challenge pulse, with which the optical fiber key is probed. Pulses of light can be shaped with several parameters, such as phase, wavelength, amplitude, pulse width, or can be modulated with a modulation pattern at a high rate.

A pseudo-random challenge pulse may be generated by generating a pseudo-random number, selecting a pseudo-random pulse parameter based on the random number, and generating an optical challenge pulse with said pseudo-random pulse parameter.

In preferred embodiments, the challenge pulse parameters comprise one or more of a pulse duration, a pulse amplitude, a pulse wavelength, a phase, a polarization, a pulse shape, a separation time to a preceding or subsequent challenge pulse, and a modulation pattern, wherein the modulation pattern in particular separates the challenge pulse into a plurality of sub-pulses.

The resulting reflected signal will generally depend on the pulse parameters. If the pulse parameters are substantially randomly selected, an eavesdropper would have to measure all properties of the pulse in order to generate a matching reflected signal, introducing a detectable time delay between challenge pulse detection and signal generation.

Further, a train of first challenge pulses may be sent to probe the optical fiber key, such that the correct reflected signal may be a sequence or a convolution of several back-scattered signals. Said sequence or convolution may be non-linear due to the generally non-linear dependence of attenuation, dispersion and Rayleigh scattering on frequency/wavelength. An eavesdropper may then be prevented, for all practical purposes, to catch the challenge signal and generate a corresponding valid (non-linear) response without introducing a significant and detectable delay, e.g., for reconstructing the challenge signal, calculating the response and reconfigure a multivariate pulse generator accordingly. For example, a separation between challenge pulses may be smaller than 10 ms, smaller than 1 ms, smaller than 100 μs, or smaller than 10 μs, such as to implement separation times which are shorter than a roundtrip time for each pulse through the optical fiber key and/or the optical connection to the optical fiber key. For example, by generating the pulse according to a modulation pattern, a train of (sub-)pulses may be generated with sub-microsecond spacing, e.g., a spacing between about 0.1 ns to about 100 ns or between about 1 ns to about 10 ns.

The separation time between subsequent challenge pulses may be varied, such as to confront the eavesdropper with an unpredictable timing of challenge pulses in a train of challenge pulses.

In some embodiments, the method comprises generating a plurality of first challenge pulses, receiving a plurality of reflected signals for the plurality of first challenge pulses, and determining the optical response signal based on the plurality of reflected signals, e.g., through averaging.

Hence, although widely-available and pre-installed fiber connections can be used as optical fiber keys and although little requirements need to be met by the challenge pulse and pulse generating system, the resulting response may nonetheless be used to authenticate the optical fiber key in a robust and practically tamper-proof way.

In preferred embodiments, the optical fiber key comprises an optical fiber having a length of at least 100 m, in particular a length of at least 1000 m.

Time domain reflectometry based methods can obtain traces of comparatively long sections of fiber. It is practically impossible to clone the physical object at scales of several hundred meters or the expected response for multivariate challenge pulses.

In preferred embodiments, the similarity metric is based on an optical response signal corresponding to a time domain reflection signal from an optical fiber section spaced by at least 100 m from an emitter of the first optical challenge pulse, in particular by at least 1000 m, along an optical fiber connection.

Different approaches may be used as a comparing algorithm, which provides a technique to determine if the received response and the expected response are similar, i.e. whether the received signal is the appropriate reflected signal from the optical fiber key. It may be, e.g., algorithms based on neural networks, other AI algorithms, statistics-based approaches of pattern recognition and similarity measures, or different correlation metrics, in order to determine a similarity metric between the optical response signal and the expected response. For example, the similarity metric may be a Pearson's correlation coefficient between the optical response signal and the expected response.

Time-domain reflectometry can be applied over long fiber sections situated several kilometers away from the pulse generator along a communication link, such that the method can be advantageously applied to long distance (remote) authentication, although the method may also be suitable for local authentication schemes.

In preferred embodiments, the method comprises receiving the reflected signal from the optical fiber key with an optical receiver tuned based on the challenge pulse parameters.

For example, the reflected signal may be multiplied with a reference signal based on the first challenge pulse, such as to extract the reflected signal from a noisy background and/or to select a response having an expected signaling delay and/or originating from the first challenge pulse. As another example, a time and/or frequency window of the receiver may be adjusted based on the challenge pulse parameters. Accordingly, the method may be implemented similar to a coherent reflectometry method, which may further increase the tamper resistance.

In preferred embodiments, the expected response is further based on the challenge pulse parameters.

For example, the reflected signal of the optical fiber key to different challenge pulses may have been characterized previously for different sets or classes of challenge pulse parameters, e.g., using OTDR, and the expected response may be generated according to the challenge pulse parameters, such as a wavelength modulation of the pulse, a phase, a polarization, or a pulse shape of the pulse.

In preferred embodiments, the method further comprises selecting at least partially randomized second challenge pulse parameters, the second challenge pulse parameters being different from the challenge pulse parameters, and generating a second optical challenge pulse based on the second challenge pulse parameters. The method further comprises determining a second optical response signal to the second optical challenge pulse based on a reflected signal from the optical fiber key, and the similarity metric is further determined based on the second optical response signal.

For example, the first optical response signal and the second optical response signal may be averaged and the similarity metric may be determined based on the averaging result and the expected response.

As discussed above, the method may send a train of pulses having different pulse parameters, such that the expected response may be a convolution of the response to different challenge pulses. By modifying the challenge pulse parameters in a pseudo-random fashion, the method may become essentially tamper-proof for practical purposes. For example, the challenge pulse parameters may be varied after a certain number of challenge pulses in a train of challenge pulses, such as by sending a train of a first number of first challenge pulses and subsequently generating a train of a second number of second challenge pulses. However, the challenge pulse parameters may also be varied after each challenge pulse in a train of challenge pulses.

The skilled person will also appreciate that a plurality of different challenge pulse parameters may be generated in some embodiments, e.g., for third, fourth and fifth challenge pulses, and so on, and the authentication may be performed based on a large number of received reflected signals to recover an optical response signal corresponding to the optical fiber key.

The skilled person will also appreciate that the challenge pulse parameters may be generated by modulating a base pulse of a train of challenge pulses, e.g., regularly spaced substantially square base pulses, which may then be effectively composed of first and second challenge pulses through signal modulation. For example, the base pulse may be modulated to be effectively composed of multiple challenge pulses, which may differ from each other or may have a partially randomized spacing based on the randomized challenge pulse parameters. Such a modulation of base pulses in a train of challenge pulses, may increase a resolution of the optical response signal and may also complicate the generation of a suitable reflected signal for an eavesdropper.

Additionally or alternatively, the method may average or convolute the reflected signals of the first and second challenge pulses as part of generating the optical response signal, e.g., as part of a lock-in technique, such that the optical response signal may be recovered from several low amplitude reflected signals, which may have different challenge pulse parameters.

In preferred embodiments, the first optical response signal and the second optical response signal are averaged or convoluted, and the optical fiber key is authenticated based on the averaged or convoluted result.

In some embodiments, the method further comprises applying a comparing algorithm to the second optical response signal and an expected response based on previously recorded responses of the optical fiber key to a reference optical challenge pulse for determining a second similarity metric. Authenticating the optical fiber key further comprises authenticating the optical fiber key based on the second similarity metric.

In some embodiments, the first similarity metric and the second optical similarity metric are averaged, and the optical fiber key is authenticated based on the averaging result.

In practical applications, reproducing a reflected signal from a pseudo-random challenge pulse will generally introduce a delay in the response, which can be detected by monitoring the arrival time of the reflected signal.

In preferred embodiments, the method further comprises comparing an arrival time of the reflected signal and an expected arrival time with respect to launching the first optical challenge pulse, and authenticating the optical fiber key also based on the comparison result.

For example, by coupling internal clocks of a challenge pulse emitter and a reflected signal receiver, e.g., by multiplying the recorded reflected signal with a reference signal based on the first challenge pulse, the time delay between the launching of the first challenge pulse and the receiving of the reflected signal may be monitored to check for potential tampering. Hence, the monitoring of the arrival time may be built into the measurement of the reflected signal, and a mismatch may result in a reduction of the optical response signal and/or the similarity metric.

In some embodiments, the method comprises recording of the arrival time of the reflected signal with respect to launching the first optical challenge pulse.

In some embodiments, authenticating the optical fiber key may form part of initiating a communication protocol between nodes of an optical fiber connection, and positively authenticating the optical fiber key positively authenticates the node associated with the optical fiber key for initiating the communication protocol. Accordingly, a first node may generate the first challenge pulse to authenticate an optical fiber key associated with a second node at an opposite side of an optical fiber connection.

The optical fiber key may be implemented by a section of fiber of an optical fiber connection between nodes that is characteristic for a node, e.g., at a receiver's end that needs to be authenticated or along the optical fiber connection between the nodes. The optical fiber key may form part of an existing standard optical fiber connection, and the method may be implemented based on existing sections of optical fiber acting as the optical fiber key. However, the method may also include providing an authentication fiber, such as a coiled section of optical fiber to function as a dedicated optical fiber key. The optical fiber key may be selectively coupled to an optical fiber network for authentication purposes, such as to minimize the possibilities of an eavesdropper to extensively characterize the optical fiber key or reroute signals to said optical fiber key, and/or may be situated at the receivers end close to a signal termination/detector.

The provision of a dedicated optical fiber key for authentication purposes may also enable the tailoring of the optical fiber key for the authentication scheme, e.g., by increasing a variance of the refractive index distribution along the propagation direction of the optical fiber key caused by structural inhomogeneities. For example, the optical fiber may be fabricated omitting compounds that prevent clustering of dopants, such that the resulting optical fiber key may have stronger dopant clustering, which may result in more pronounced back-scattering in the associated fiber sections. In addition or alternatively, the optical fiber key may be treated e.g., using heat radiation, mechanical strain or additional doping to increase scattering of light in the optical fiber key.

In preferred embodiments, a variance of the back-scattered power associated with the optical fiber key is at least 20% larger, preferably at least 50% larger, and most preferably 100% larger, than a variance of the back-scattered power associated with other continuous sections of optical fiber along a communication path through which the first challenge signal is transmitted.

The skilled person will appreciate in this context that joints of different fibers may be associated with significant signal loss, while amplifiers along the optical path may equally cause significant variation in the signal. However, such events in the time domain trace would not be considered as originating from extended continuous sections of an optical fiber in the sense of the above, and would therefore generally not constitute other continuous sections of optical fiber, as discussed above.

In some embodiments, the method further comprises generating scattering clusters in the optical fiber key for inducing localized scattering sites, such that a variance of the response signal is increased. Such clusters can be created by doping optical fibers with large molecules, creating hollow microstructures or gas bubbles inside the fiber, or other methods known in the art.

The method according to the first aspect may be implemented on a processing system. The processing system may comprise a single processing unit or may comprise a plurality of processing units, which may be functionally connected. The processing units may comprise a microcontroller, an ASIC, a PLA (CPLA), an FPGA, or other processing device, including processing devices operating based on software, hardware, firmware, or a combination thereof. The processing devices can include an integrated memory, or communicate with an external memory, or both, and may further comprise interfaces for connecting to sensors, devices, appliances, integrated logic circuits, other controllers, or the like, wherein the interfaces may be configured to receive or send signals, such as electrical signals, optical signals, wireless signals, acoustic signals, or the like. For example, the processing system may be connected to a pulse generation system and/or an optical receiver via a data interface for sending instructions related to the challenge pulse parameters.

According to a second aspect, the invention relates to a non-transitory medium comprising machine-readable instructions, which, when executed by a processing system, implement a method according to the first aspect.

According to a third aspect, the invention relates to a system for authenticating an optical fiber key. The system comprises a control system configured to select at least partially randomized challenge pulse parameters, and generate machine-readable instructions to launch a first optical challenge pulse based on the challenge pulse parameters by a challenge emitter. The control system is further configured to determine an optical response signal based on a reflected signal of the first optical challenge pulse from the optical fiber key re; and apply a comparing algorithm to the optical response signal and an expected response based on previously recorded optical response signals of the optical fiber key to a reference optical challenge pulse to determine a similarity metric.

The system may implement the method according to the first aspect or any combination of its embodiments. The system may authenticate the optical fiber key depending on the similarity metric, or send the similarity metric to an external authentication system.

In preferred embodiments, the system further comprises an optical receiver adapted to receive the reflected signal.

The system may also record an arrival time of the reflected signal with respect to a launch time of the first challenge pulse.

In preferred embodiments, the optical receiver is tuned based on the challenge pulse parameters for receiving the reflected signal from the optical fiber key.

In preferred embodiments, the expected response is further based on the challenge pulse parameters.

In preferred embodiments, the challenge pulse parameters comprise one or more of a pulse duration, a pulse amplitude, a pulse wavelength, a phase, a polarization, a pulse shape, a separation time to a preceding or subsequent challenge pulse, and a modulation pattern, wherein the modulation pattern in particular separates the challenge pulse into a plurality of sub-pulses.

In preferred embodiments, the control system is further configured to select at least partially randomized second challenge pulse parameters, the second challenge pulse parameters being different from the challenge pulse parameters, and generate machine-readable instructions to launch a second optical challenge pulse based on the second challenge pulse parameters. The control system is further configured to determine a second optical response signal to the second optical challenge pulse based on a reflected signal from the optical fiber key, and the similarity metric is further determined based on the second optical response signal.

BRIEF DESCRIPTION OF THE SEVERAL VIEWS OF THE DRAWINGS

FIG. 2 is a flowchart for an exemplary authentication method in accordance with the disclosure.

FIG. 5 illustrates an example of a matrix of the correlation metrics of eleven consecutive measurements of the same fiber section in accordance with the disclosure.

DETAILED DESCRIPTION OF PREFERRED EMBODIMENTS

Figure 1A:
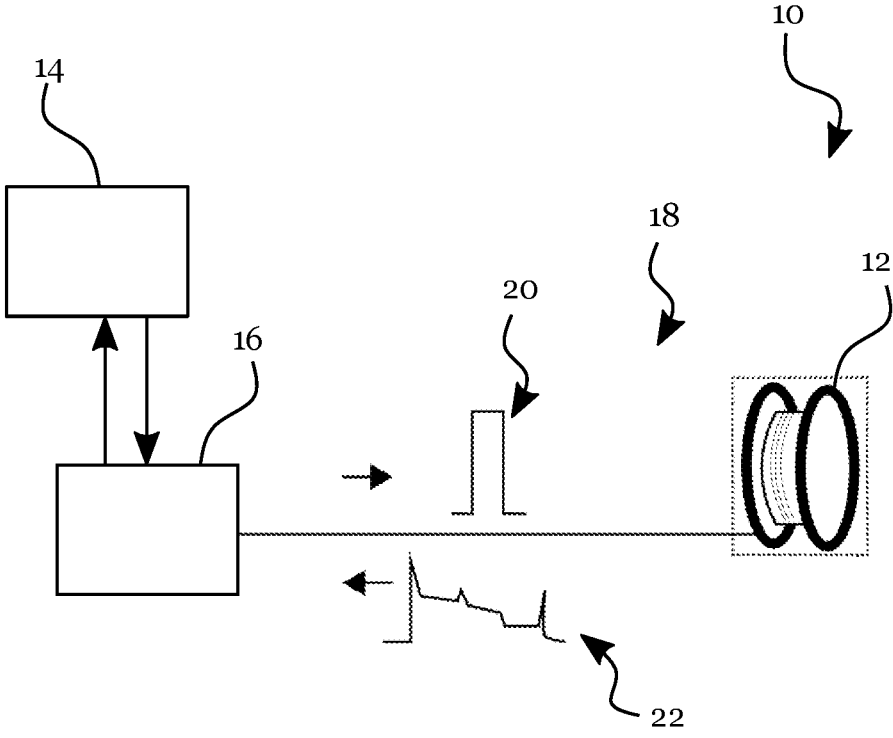
FIG. 1A schematically illustrates an example of an authentication system in accordance with the disclosure.

FIG. 1A schematically illustrates an example of a system 10 for authenticating an optical fiber key 12. The system comprises a control system 14 coupled to an optical interface 16. The optical interface 16 is coupled to an optical fiber connection 18 and can be instructed to launch an optical challenge pulse 20 through the optical fiber connection 18 to the optical fiber key 12.

The challenge pulse 20 can be partially scattered by inhomogeneities of the internal fiber structure along the optical fiber connection 18 and the optical fiber key 12, which gives rise to a reflected signal 22. The reflected signal 22 propagates along the optical fiber connection 18 in the opposite direction as the optical challenge pulse 20, and its time dependent amplitude may depend on the spatial distribution of refractive index variations along the optical fiber connection 18. Accordingly, the reflected signal 22 may be a convolution of the pulse shape of the challenge pulse 20 and the spatial dependence of the back-scattering coefficients of the optical fiber connection 18 and the optical fiber key 12. The reflected signal 22 may be recorded at the optical interface 16, e.g., using a photodiode coupled to the optical interface 16, and may be processed by the control system 14 for obtaining an optical response signal indicative of the spatially dependent back-scattering of the optical fiber key 12.

For homogeneous optical fibers, reflectometric measurement theory in principle predicts a linear decrease in the optical power level along the optical fiber connection 18 and the optical fiber key 12.

Figure 1B:
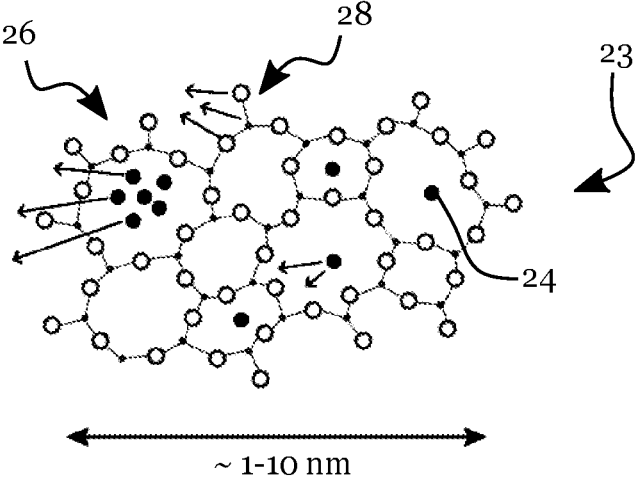
FIG. 1B schematically illustrates an example of an internal structure of an optical fiber in accordance with the disclosure.

However, as can be seen in the schematic example of FIG. 1B, the internal structure 23 of an optical fiber connection is in general not homogeneous, but features irregularities, which can give rise to local scattering of light. For example, dopant atoms 24 or clusters of dopant atoms 26 can act as scattering centers for incident light. Further, inhomogeneities 28 in the underlying internal structure 23 may equally contribute to the back-scattering in the optical fiber connection 18 and the optical fiber key 12. Since doping is an integral process in optical fiber fabrication, and the spatial configuration of doping atoms 26, 28 is in general random, optical fibers 12, 18 will express a pronounced variation in the effective refractive index. This variation can be measured based on a back-scattered light intensity pattern, e.g., using a measurement similar to optical time domain reflectometry (OTDR).

The present disclosure proposes use of the variance in the back-scattering in the optical fiber key 12 to authenticate the optical fiber key 12 over an optical interface.

FIG. 2 illustrates a computer-implemented method for authenticating an optical fiber key 12. The method comprises selecting at least partially randomized challenge pulse parameters (S10), and generating a first optical challenge pulse 20 based on the challenge pulse parameters (S12). The method further comprises determining an optical response signal based on a reflected signal 22 of the first optical challenge pulse 20 from the optical fiber key 12 recorded in time domain (S14) and applying a comparing algorithm to the optical response signal and an expected response based on previously recorded optical response signals of the optical fiber key 12 to a reference optical challenge pulse for determining a similarity metric (S16). The method then comprises authenticating the optical fiber key 12 based on the similarity metric (S18).

The expected response can be based on a previously measured reflected signal 22 to an optical challenge pulse 20, or can be based on reference data for the optical fiber key 12, such as a previously measured OTDR trace, e.g., the expected response may be a simulated optical response based on the previously measured OTDR trace, which can be directly compared to the reflected signal 22.

However, the method may also determine an OTDR trace from the reflected signal 22 or from a plurality of the reflected signals 22 obtained in sequence as an optical response signal, which can be directly compared to a previously measured OTDR trace of the optical fiber key 12.

The control system 14 may then applying a comparing algorithm (e.g., calculate a correlation metric) to the reference optical response signal and the expected response signal to determine, whether the reflected signal 22 has been back-scattered from the optical fiber key 12 for authenticating the optical fiber key 12.

However, contrary to common OTDR measurements, the properties of optical challenge pulse 20, and preferably a sequence of optical challenge pulses 20, are at least partially randomized, e.g., with respect to pulse wavelength/frequency, phase or a modulation envelope.

The internal structure 23 of the optical fiber key 12 is practically impossible to clone with state of the art technology. Hence, an eavesdropper wishing to mimic the optical fiber key 12 would have to generate a reflected signal 22 corresponding to the randomized challenge pulse 20 with a tuned emitter, e.g., based on the average back-scattering power profile in the optical fiber key 12. However, a significant processing delay needs to be typically expended for analyzing the pulse parameters, reconfiguring a pulse generator and launching a pulse mimicking the genuine reflected signal 22.

The reflected signal 22 propagates at the speed of light of the medium, such that the genuine response to the challenge pulse 20 is substantially instantaneous. Further, the spatially varying back-scattering coefficients in the optical fiber key 12 may depend non-linearly on the modulated pulse parameters, such as wavelength/frequency. Hence, a multivariate analysis of the challenge pulse 20 generally needs to be performed before generating an appropriate signal mimicking the genuine reflected signal 22. Thus, an eavesdropper, trying to replicate the reflected signal 22 of the genuine optical fiber key 12, is generally faced with a task, which is practically impossible without introducing a significant and detectable delay.

Hence, the method may be used as a simple, but practically tamper-proof way of authenticating a physical optical fiber key 12 associated with an optical fiber connection 18.

Moreover, the inventors found that a target optical fiber key 12 can be reliably distinguished in measurements even from different sections of the same fiber, such that the proposed method is expected to also be robust in applications.

Figure 3:
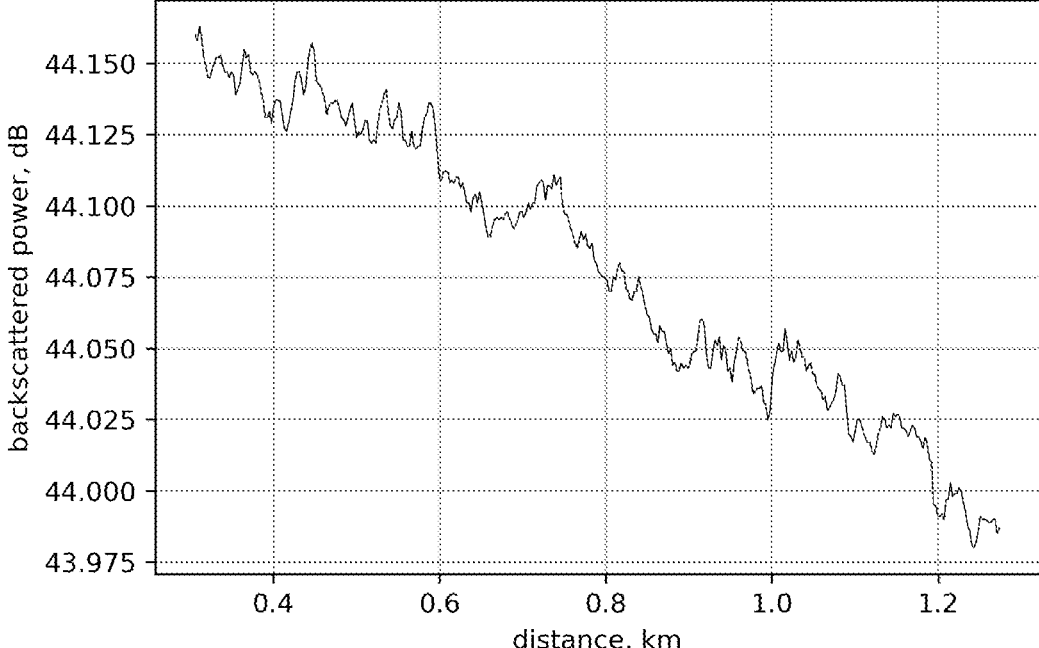
FIG. 3 illustrates an example of an OTDR trace from an optical fiber section as an exemplary optical fiber key in accordance with the disclosure.

FIG. 3 illustrates an OTDR trace from an optical fiber section as an exemplary optical response of an optical fiber key 12. The measured optical fiber section is a section of a common single mode telecom fiber of 1 km length, the optical fiber having a total length of approximately 25 km. The measurements were carried out with an OTDR at a wavelength of $\lambda$=1550 nm with a pulse duration of the challenge pulses 20 of 1 µs. The horizontal axis shows the distance along the fiber section, and the vertical axis shows the back-scattered power, expressed in decibels (dB).

The optical time-domain reflectometry (OTDR) device probes the optical fiber section with a sequence of light pulses 20 generated with a laser and records the reflected signal 22 in time domain using a photodiode for reconstructing the spatial profile of the back-scattered power.

As can be seen in FIG. 3, the optical reflectogram of the optical fiber, obtained with the OTDR device, approximates a sum of a falling straight line and a randomly varying power level with distance. The latter fluctuations can be at least partially attributed to characteristic structural inhomogeneities of the optical fiber and can be used as fingerprints of an optical fiber key 12. The randomly varying power fluctuations may be extracted from a measurement, e.g., by removing a linear fit of the back-scattered power signal, for correlation with reference data.

It should be taken into account that the exemplary reflectogram shown in FIG. 3 results from averaging measurements corresponding to a set of challenge pulses with identical pulse parameters. This averaging is to reduce the noise in the technical equipment that operates using the OTDR technology. However, the use of appropriate averaging does not provide a significant advantage to the eavesdropper, since each of the identical challenge pulses transmitted over the optical fiber in the process of accumulating responses to be further averaged can be prepared with a complex structure. For example, in a train of challenge pulses, each pulse may be modulated with a complex modulation pattern, e.g., to be effectively composed of a plurality of sub-pulses with different properties. An eavesdropper who still needs to measure all the properties of the complex identical pulses in the train of challenge pulses to generate the appropriate reflected signals will not reliably measure all properties of the challenge pulses and tune a corresponding emitter without introducing a detectable time delay between pulse detection and signal generation. Additionally or alternatively, the properties of the challenge pulses may also be varied at pre-determined or pseudo-random intervals, e.g., by providing different challenge pulse parameters for subsequent trains of challenge pulses, which may then also comprise a different sub-pulse (modulation) pattern.

Figure 4:
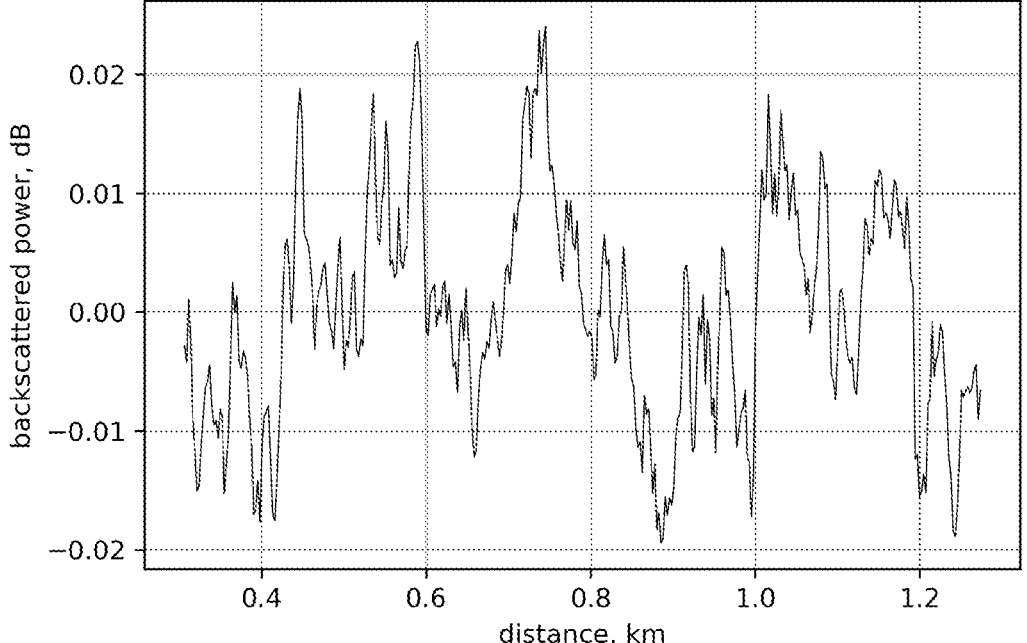
FIG. 4 illustrates an example of a back-scattered power fluctuation trace based on the same measurement data as in FIG. 3.

FIG. 4 illustrates an example of a back-scattered power fluctuation trace based on the same measurement data as in FIG. 3, wherein the linear contribution has been removed by subtraction of a linear fit according to the least squares method (LSM). The resulting trace may be considered an optical response signal for the optical fiber key 12, which may be compared to future optical response signals for authenticating the optical fiber key 12, e.g., based on a similarity metric.

FIG. 5 illustrates an example of a matrix of the correlation metrics of eleven consecutive measurements of the same fiber section, as exemplary similarity metrics. The correlation metrics correspond to a Pearson's correlation coefficient of the respective back-scattered power fluctuation traces associated with the respective row and column as discussed in conjunction with FIG. 4. The measurements were carried out with an OTDR device operating at a wavelength of $\lambda$=1550 nm with a pulse duration of 500 ns.

The figure shows the correlation metrics for the respective pairs of back-scattered power fluctuation traces as numbers in a matrix, which are in addition grey-scale coded for better visual identification. As can be seen in the figure, the correlation metric between the different measurements is always greater than 0.9, indicating that the measurement is robust over time. Long-term measurements of the inventors have shown that the auto-correlation of measurements of the same fiber section remains above 0.5 even after several hours, indicating that an optical fiber key 12 may be reliably identified according to its average back-scattered power fluctuation profile.

Figure 6:
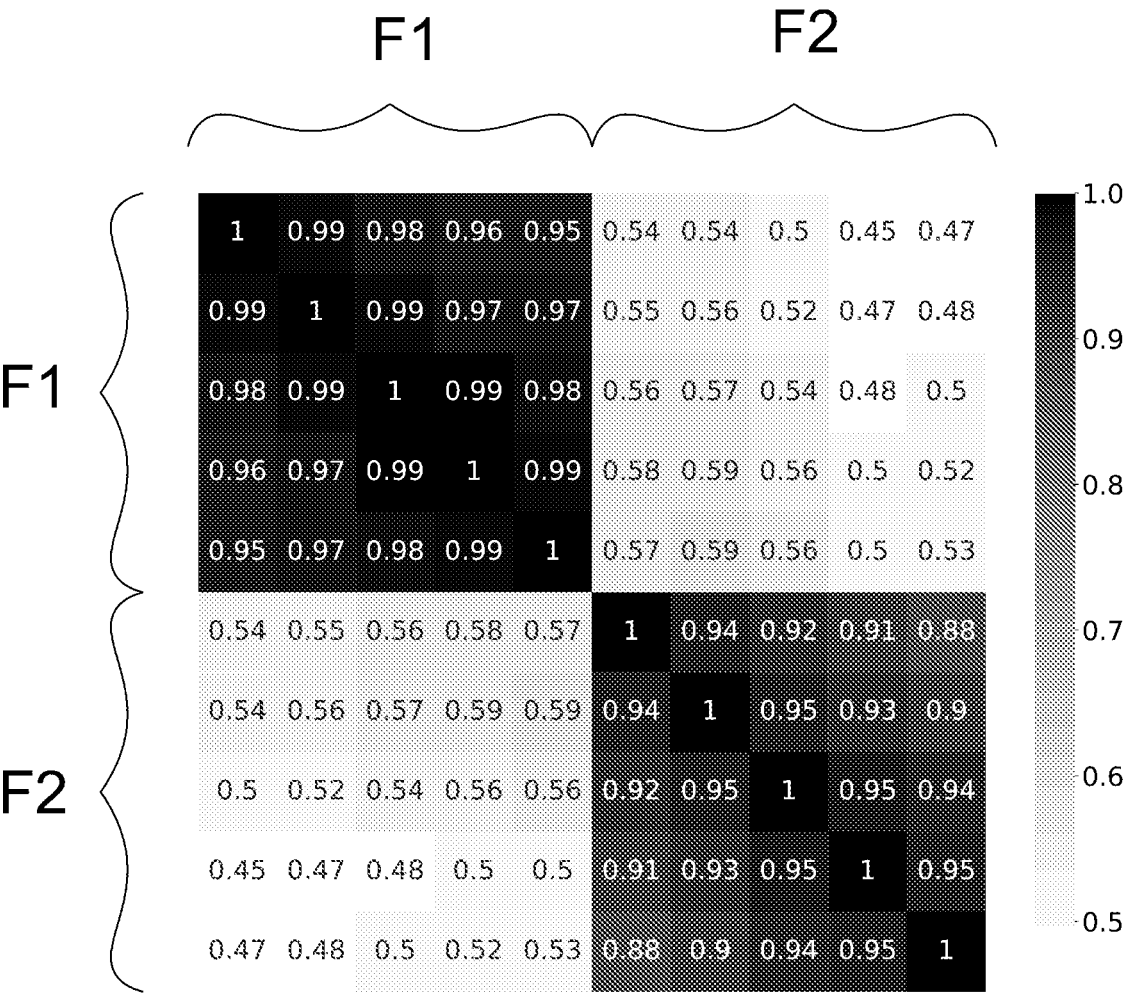
FIG. 6 illustrates an example of correlation results between multiple back-scattered power fluctuation traces of different fiber sections similar to the example of FIG. 5.

FIG. 6 illustrates an example of correlation results between multiple back-scattered power fluctuation traces of two different fiber sections F1, F2 similar to the example of FIG. 5. In the figure, the first five matrix elements (numbered 0-4) are associated with back-scattered power fluctuation traces of a first fiber section F1 of a common single mode optical fiber. The second five matrix elements (numbered 5-9) are associated with back-scattered power fluctuation traces of a second fiber section F2 of the same optical fiber, which is located at a different location along the optical fiber. It can be seen from FIG. 6 that traces of the same fiber sections F1, F2 have high similarity, expressed by values of the correlation metric above 0.6, whereas the correlation metric between different fiber sections F1, F2 is close to zero, and below 0.1.

Accordingly, an optical response signal, which similarly depends on the spatially varying back-scattering of an optical fiber key 12, which can be probed with the reflected signal 22, may be reliably used to authenticate a device or user at or in possession of the optical fiber key 12, and therefore may be used to authenticate a communication channel.

For additional tamper resistance, the optical fiber key 12 may be selectively connected to the optical fiber connection 18, e.g., in response to a request, which can prevent extended readout of the optical fiber key 12 by a third party.

Although the previous examples relate to standard single mode optical fibers used in telecommunications, other optical fibers may be considered as optical fiber keys 12. For example, the optical fiber key 12 may be fabricated to feature increased back-scattered power fluctuations, e.g., by modifying a distribution of scattering centers in the optical fiber key 12.

The distribution of scattering centers will result in a spatially varying Rayleigh back-scattering coefficient $\alpha$ $$\alpha = \frac{4\omega^4}{3\pi^2 c^4 \omega_0^2 l_p} \left| \int_{\frac{v_g t - l_p}{2}}^{\frac{v_g t}{2}} dz e^{i2\beta z} \int \int dx dy \Delta\chi(x, y, z) e^{-\frac{2(x^2+y^2)}{\omega_0^2}} \right|^2 \quad (1)$$

where $\Delta_\chi(x,y,z)$ describes the distribution of small scale inhomogeneities 24-28 of the local electric susceptibility which act as induced dipole oscillators, and ω relates to the frequency of the light (as discussed in detail in E. Brinkmeyer: "*Analysis of the backscattering method for single-mode optical fibers*").

Since Rayleigh back-scattering can be caused by the afore-mentioned inhomogeneities 24-28 of the internal structure 23, the distribution $\Delta\chi(x, y, z)$ may eventually determine the complexity of the optical fiber-based key 12. So the desirable property of the optical fiber key 12 from a physical point of view may be considered a heterogeneity of distribution $\Delta\chi(x, y, z)$.

Accordingly, the distribution of scattering centers may be modified e.g., by increasing a doping level, avoiding chemical compounds commonly employed to prevent clustering of dopants in optical fibers, or mechanical or radiation treatment of an optical fiber, which will in general increase the back-scattering power fluctuations.

A dedicated optical fiber key 12 preferably features a larger variance of the back-scattered power than other continuous sections of the optical fibers of the optical fiber connection 18. For example a variance of the back-scattered power in the optical fiber key 12 may be at least 50% larger than the corresponding variance of the back-scattered power in other optical fiber sections along the optical connection 18 of at least similar length. As a result of the increased variance, the optical fiber key 12 may be probed with fewer challenge pulses 20 or with challenge pulses 20 of lower amplitude.

Figure 7:
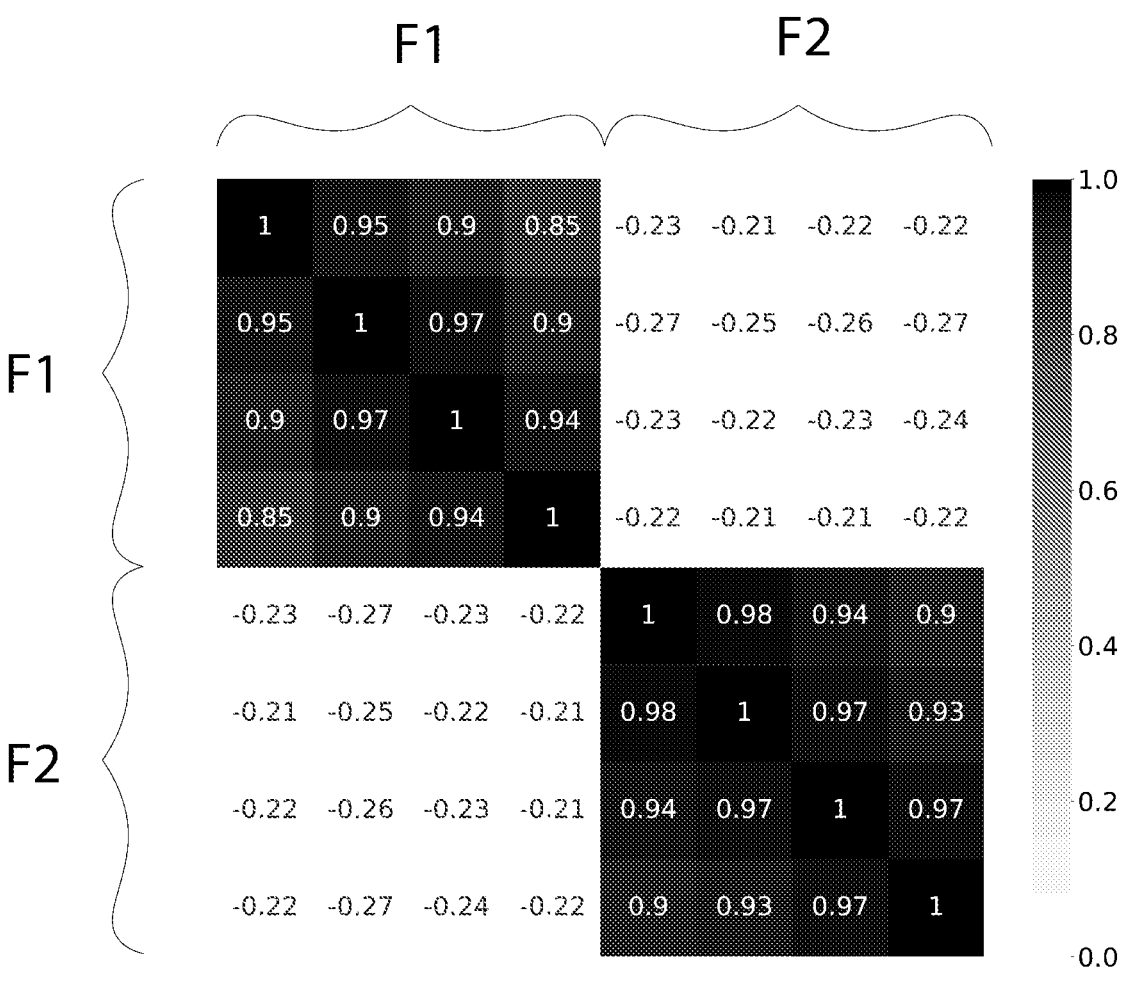
FIG. 7 illustrates a further example of a correlation matrix of a further optical fiber, wherein the correlation matrix is obtained similarly to the diagram of FIG. 6.

FIG. 7 shows a further example of a correlation matrix similar to the diagram of FIG. 6, but relating to different sections F1, F2 of polarization maintaining germanium doped fiber with stress rods. The fiber sections F1, F2 are each 1200 m long and the back-scattered power as a function of distance was measured using an OTDR device operating at a wavelength of λ=1550 nm and with a pulse duration of 100 ns.

In the figure, the first four matrix elements are associated with a first fiber section F1 and the second four matrix elements are associated with a second fiber section F2 of the same optical fiber, which is located at a different location along the optical fiber. Again, back-scattered power fluctuation traces of the same fiber sections F1, F2 have high similarity, expressed by values of the correlation metric above 0.8, whereas the correlation metric between different fiber sections F1, F2 is close to zero, and below 0.1.

The use of a polarization-maintaining fiber as in the example of FIG. 7 may increase a dependence of the back-scattered power on a polarization of a challenge pulse 20 and may therefore improve the authentication of the optical fiber key 12 via the method.

The skilled person will appreciate that, although the correlation metric used in the above examples is a correlation function of the back-scattered power fluctuations of a target fiber section F1, F2 after removal of a linear contribution, correlation metrics based on other optical response signals may be used in embodiments. For example, it may not be necessary to reconstruct a full trace of the back-scattered power fluctuations, but the method may only use optical response signals, which reflect specific portions of an optical fiber key 12. The specific portions may be related to fiber sections F1, F2 associated with large back-scattered power variance or characteristic profiles of the back-scattered power fluctuations. Further, the (average) reflected signal 22 may also be directly compared to an expected reflected signal, which may be generated based on a previously computed OTDR trace of the optical fiber key 12.

The correlation metrics may be used as options of a comparing algorithm for a received response from the optical key and reference signal. The correlation metric in the examples shown in FIGS. 5-7 is a Pearson's correlation coefficient of the two curves, such that perfectly overlapping curves (traces) result in a value of the correlation coefficient of 1. However, the skilled person will appreciate that any correlation metric, which attributes a measure of similarity to two sets of data points may be used in embodiments to implement a correlation metric, which can be used for authenticating an optical fiber key 12 based on measurements of the reflected signal 22 for a challenge pulse 20.

The skilled person will further appreciate that although the detailed embodiments focused on an authentication based on an optical response signal similar to an optical time domain reflectometry response of the optical fiber key 12, the method may not be limited to such a scheme, but the optical fiber key 12 may also be probed with other techniques known in the art, e.g., including coherent challenge pulses 20 and detecting a coherent response of the optical fiber key 12.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 system
12 optical fiber key
14 control system
16 optical interface
18 optical fiber connection
20 challenge pulse
22 reflected signal
23 internal structure
24 dopant atom
26 cluster of dopant atoms
28 inhomogeneity of internal structure
F1 first fiber section
F2 second fiber section All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for authenticating an optical fiber key, the method comprising:
    selecting a plurality of at least partially randomized challenge pulse parameters;
    generating a first optical challenge pulse based on the plurality of at least partially randomized challenge pulse parameters;
    determining an optical response signal based on a reflected signal of the first optical challenge pulse from the optical fiber key, wherein the optical fiber key comprises a section of an optical fiber connection having a length of at least 100m or more;
    applying a comparing algorithm to the optical response signal and an expected response based on previously recorded optical response signals of the optical fiber key to a reference optical challenge pulse for determining a similarity metric; and
    authenticating the optical fiber key based on the similarity metric.

2. The method of claim 1, wherein the optical response signal is based on averaged variations of a backscattered light signal due to core refractive index fluctuations of the optical fiber key.

3. The method of claim 1, wherein the plurality of at least partially randomized challenge pulse parameters comprises one or more of a pulse duration, a pulse amplitude, a pulse wavelength, a phase, a polarization, a pulse shape, a separation time to a preceding or subsequent challenge pulse, and a modulation pattern, wherein the modulation pattern in particular separates the challenge pulse into a plurality of sub-pulses.

4. The method of claim 1, wherein the similarity metric is based on an optical response signal corresponding to a time domain reflection signal from an optical fiber section spaced by at least 100 m from an emitter of the first optical challenge pulse along an optical fiber connection.

5. The method of claim 1, wherein the optical fiber key comprises an optical fiber having a length of at least 1000 m, wherein the similarity metric is based on an optical response signal corresponding to a time domain reflection signal from an optical fiber section spaced by at least 1000 m from an emitter of the first optical challenge pulse along an optical fiber connection.

6. The method of claim 1, wherein the method further comprises receiving the reflected signal from the optical fiber key with an optical receiver tuned based on the challenge pulse parameters.

7. The method of claim 1, wherein the expected response is further based on the challenge pulse parameters.

8. The method of claim 1, wherein the method further comprises:
    selecting a second plurality of at least partially randomized challenge pulse parameters, the second plurality of at least partially randomized challenge pulse parameters being different from the plurality of at least partially randomized challenge pulse parameters;
    generating a second optical challenge pulse based on the second plurality of at least partially randomized challenge pulse parameters; and
    determining a second optical response signal to the second optical challenge pulse based on a reflected signal from the optical fiber key;
    wherein the similarity metric is further determined based on the second optical response signal.

9. The method of claim 8, wherein the first optical response signal and the second optical response signal are averaged or convoluted, and the optical fiber key is authenticated based on the averaged or convoluted result.

10. The method of claim 1, wherein the method further comprises comparing an arrival time of the reflected signal and an expected arrival time with respect to launching the first optical challenge pulse, and authenticating the optical fiber key also based on the comparison result.

11. The method of claim 1, wherein a variance of the back-scattered power associated with the section of optical fiber associated with the optical fiber key is at least 20-100% larger than a variance of the back-scattered power associated with other continuous sections of optical fiber along the optical fiber connection through which the first challenge signal is transmitted.

12. A system for authenticating an optical fiber key, the system comprising a control system configured to:
    select a plurality of at least partially randomized challenge pulse parameters;
    control a challenge emitter to launch a first optical challenge pulse based on the plurality of at least partially randomized challenge pulse parameters;
    determine an optical response signal based on a reflected signal of the first optical challenge pulse from the optical fiber key, wherein the optical fiber key comprises a section of an optical fiber connection having a length of at least 100 m or more; and
    apply a comparing algorithm to the optical response signal and an expected response based on previously recorded optical response signals of the optical fiber key to a reference optical challenge pulse to determine a similarity metric.

13. The system of claim 12, wherein the system further comprises an optical receiver adapted to receive the reflected signal and record an arrival time of the reflected signal with respect to a launch time of the first challenge pulse.

14. The system of claim 13, wherein the optical receiver is tuned based on the challenge pulse parameters for receiving the reflected signal from the optical fiber key.

15. The system of claim 14, wherein the expected response is further based on the plurality of at least partially randomized challenge pulse parameters.

16. The system of claim 12, wherein the plurality of at least partially randomized challenge pulse parameters comprises one or more of a pulse duration, a pulse amplitude, a pulse wavelength, a phase, a polarization, a pulse shape, a separation time to a preceding or subsequent challenge pulse, and a modulation pattern, wherein the modulation pattern in particular separates the challenge pulse into a plurality of sub-pulses.

17. The system of claim 12, wherein the control system is further configured to:

select a second plurality of at least partially randomized challenge pulse parameters, the second plurality of at least partially randomized challenge pulse parameters being different from the plurality of at least partially randomized challenge pulse parameters;

generate machine-readable instructions to launch a second optical challenge pulse based on the second plurality of at least partially randomized challenge pulse parameters; and determine a second optical response signal to the second optical challenge pulse based on a reflected signal from the optical fiber key;

wherein the similarity metric is further determined based on the second optical response signal.

* * * * *